United States Patent
Son et al.

(10) Patent No.: US 7,034,847 B2
(45) Date of Patent: Apr. 25, 2006

(54) METHOD OF FORMING PIXEL CELL FOR THREE-DIMENSIONAL IMAGE DISPLAY

(75) Inventors: Jung-Young Son, Seoul (KR); Sang-Hoon Shin, Seoul (KR); Yong-Jin Choi, Seoul (KR); Saveliev Vladmir, Seoul (KR); Kae-Dal Kwack, Seoul (KR)

(73) Assignee: Hanyang Hak Won Co., Ltd, (KR)

( * ) Notice: Subject to any disclaimer, the term of this patent is extended or adjusted under 35 U.S.C. 154(b) by 89 days.

(21) Appl. No.: 10/871,140

(22) Filed: Jun. 18, 2004

(65) Prior Publication Data

US 2005/0057567 A1    Mar. 17, 2005

(30) Foreign Application Priority Data

Sep. 17, 2003 (KR) .................. 10-2003-0064447

(51) Int. Cl.
*G09G 5/00* (2006.01)
(52) U.S. Cl. ...................... 345/613; 345/614
(58) Field of Classification Search ................ 345/611, 345/613, 614
See application file for complete search history.

(56) References Cited

U.S. PATENT DOCUMENTS 6,606,078 B1 * 8/2003 Son et al. ...................... 345/6
6,654,017 B1 * 11/2003 Ali-Santosa ................. 345/443

\* cited by examiner

*Primary Examiner*—Richard Hjerpe
*Assistant Examiner*—Kevin Xu
(74) *Attorney, Agent, or Firm*—Knobbe Martens Olson & Bear LLP

(57) ABSTRACT

A method of forming pixel cell for three-dimensional image display is provided. The method of forming pixel cell according to this invention relates to a method of forming pixel-cell in a three-dimensional image display system including an image display panel in which a plurality of unit patterns are arranged in a vertical direction and horizontal direction and an optical plate having repetitive pattern. The method according to this invention comprising regarding each side of rhombus pattern having an arbitrary vertex angle as a straight line having a predetermined slant; calculating a number of unit pattern in vertical direction and a number of unit pattern in horizontal direction, corresponding to said predetermined slant; approximating said predetermined slant to stepped patterns with said number of unit pattern in vertical direction and said number of unit pattern in horizontal direction; and forming said pixel cell using said stepped patterns. And integer-numbered unit patterns are arranged in said pixel cell. By the present invention, quality degradation of a three-dimensional image due to Moire patterns is reduced.

17 Claims, 16 Drawing Sheets

METHOD OF FORMING PIXEL CELL FOR THREE-DIMENSIONAL IMAGE DISPLAY

BACKGROUND OF THE INVENTION

1. Filed of the Invention

The present invention relates to a display of three-dimensional image, and specifically, to a method of forming pixel-cell for three-dimensional image display.

2. Description of the Related Technology

Generally, since men can see three-dimensional images within only a viewing zone, so an optical apparatus must be needed to form the viewing zone, which forms two viewing zones. One is distributed at a predetermined distance from the front of image display panel. The other is distributed at only predetermined region in front of image display panel. In general, contact-type three-dimensional image display method corresponds to the former, and projection-type image display method corresponds to the latter.

A contact-type full parallax three-dimensional image display apparatus uses an image display panel and one or two special optical plate(s) which is(are) overlapped on the image display panel for division of multiple viewpoint image and for forming the viewing zone. But since optical elements of the optical plates or pixels of the image display panel are arranged in periodic pattern, Moire pattern appears due to the overlap of optical plates and deteriorates the displayed images. Since Moire pattern is a natural phenomenon produced due to the interference between those repetitive patterns (e.g., stripe pattern) of overlapped optical plates or sheets it is impossible to eliminate the Moire pattern completely by any physical means.

The angle between patterns of two or more overlapping optical plates is generally about 90° or ±45° to form the full parallax three-dimensional image, and at this angle, the effect of the Moire phenomenon is very high. But a period of Moire patterns is varied according to the angle between patterns. Therefore, by adjusting the directions of arrangement of optical plates which are overlapped on/below the image display panel from the direction of pixel arrangement of the image display panel, it's possible to make the period of Moire pattern at a region where three-dimensional image is viewed to be below the resolution of viewer's eye. Therefore, the Moire pattern effect is decreased.

To implement a full parallax-type three-dimensional image display apparatus, it is needed to arrange multiple-view images on the image display panel in a unit of pixel cell having identical shape and size. Furthermore, it is needed for each optical element of optical plates which are overlapped on the image display panel to expand corresponding pixel cell and to be overlapped exactly at one spatial position for forming viewing zone. To do so, it is necessary to vary the shape of the pixel cell according to the arrangement directions of optical plates, and especially in order to satisfy the latter condition it is preferred that all pixel cells have the same shape and size. Furthermore, it is preferred that the pixel cells are arranged without gap on the image display panel.

However, in conventional flat display apparatus including LCD(Liquid Crystal Display) as used image display panel, square-type pixels are arranged in checker board pattern, wherein the pixel is a unit element for displaying image in image display panel. It is preferred that the pixel cell for three-dimensional image display comprises two or more pixels.

However, in case of forming rhombus-type pixel cell having an arbitrary vertex angle besides square or rectangular pixel cell, some pixels may be divided by sides of rhombus-type pixel cell and the divided pixel may be inserted into two or more different pixel cells. Because the pixels located along sides of rhombus-type pixel cell are inserted into two or more different pixel cells, positions of divided pixels in a viewing zone are different. Thus the resolution of a three-dimensional image is deteriorated.

SUMMARY OF CERTAIN INVENTIVE ASPECTS OF THE INVENTION

One aspect of the present invention is to overcome the drawbacks and disadvantages of the prior art, and to provide a method of forming pixel-cell and a three-dimensional image processing method for improve the quality of a three-dimensional image degraded due to Moire patterns in a full parallax three-dimensional image display system.

Another aspect of the present invention provides a method of forming pixel-cell in a three-dimensional image display system including an image display panel having a unit pattern repetitively arranged in a vertical direction and horizontal direction and an optical plate having repetitive pattern, comprising the steps of: assuming each side of rhombus pattern having an arbitrary vertex angle as straight line having a predetermined slant; calculating a number of unit pattern in vertical direction and a number of unit pattern in horizontal direction, corresponding to said predetermined slant; approximating said predetermined slant to stepped patterns with said number of unit pattern in vertical direction and said number of unit pattern in horizontal direction; and forming pixel cell using said stepped patterns, wherein integer-numbered unit patterns are arranged in the pixel cell, and a computer readable medium for storing said method is provided.

It is preferred that forming said pixel cell using said stepped patterns, comprises the steps of: approximating said each side of the rhombus pattern to a discrete line formed by connecting said stepped patterns successively.

It is also preferred that said rhombus pattern is formed by intersecting two straight line groups having a different slant each other, wherein each line group is arranged in parallel and regularly spaced.

It is also preferred that said pixel cell is bounded by discrete lines corresponding to two parallel sides of the rhombus pattern.

Another aspect of the present invention provides a three-dimensional image processing method in a three-dimensional image display system including an image display panel having a unit pattern repetitively arranged in a vertical direction and horizontal direction and at least two optical plates having repetitive pattern, comprising the steps of: obtaining a number of unit pattern in vertical direction (thereafter, a first vertical unit pattern number) and a number of unit pattern in horizontal direction(thereafter, a first horizontal unit pattern number), corresponding to a slant of repetitive pattern of the first optical plate(thereafter, a first slant); obtaining a number of unit pattern in vertical direction(thereafter, a second vertical unit pattern number) and a number of unit pattern in horizontal direction(thereafter, a second horizontal unit pattern number), corresponding to a slant of repetitive pattern of the second optical plate(thereafter, a second slant); approximating said repetitive pattern of the first optical plate using a first stepped pattern corresponding to said first vertical unit pattern number and said first horizontal unit pattern number; and approximating said repetitive pattern of the second optical plate using a second stepped pattern corresponding to said second vertical unit pattern number and said second horizontal unit pattern number, wherein cell pattern formed by said approximated repetitive pattern of the first optical plate and said approximated repetitive pattern of the second optical plate is used as pixel cell for displaying three-dimensional image and a computer readable medium for storing said method is provided.

It is preferred that integer-numbered unit patterns are arranged in said pixel cell.

DETAILED DESCRIPTION OF CERTAIN EMBODIMENTS OF THE INVENTION

Figure 1:
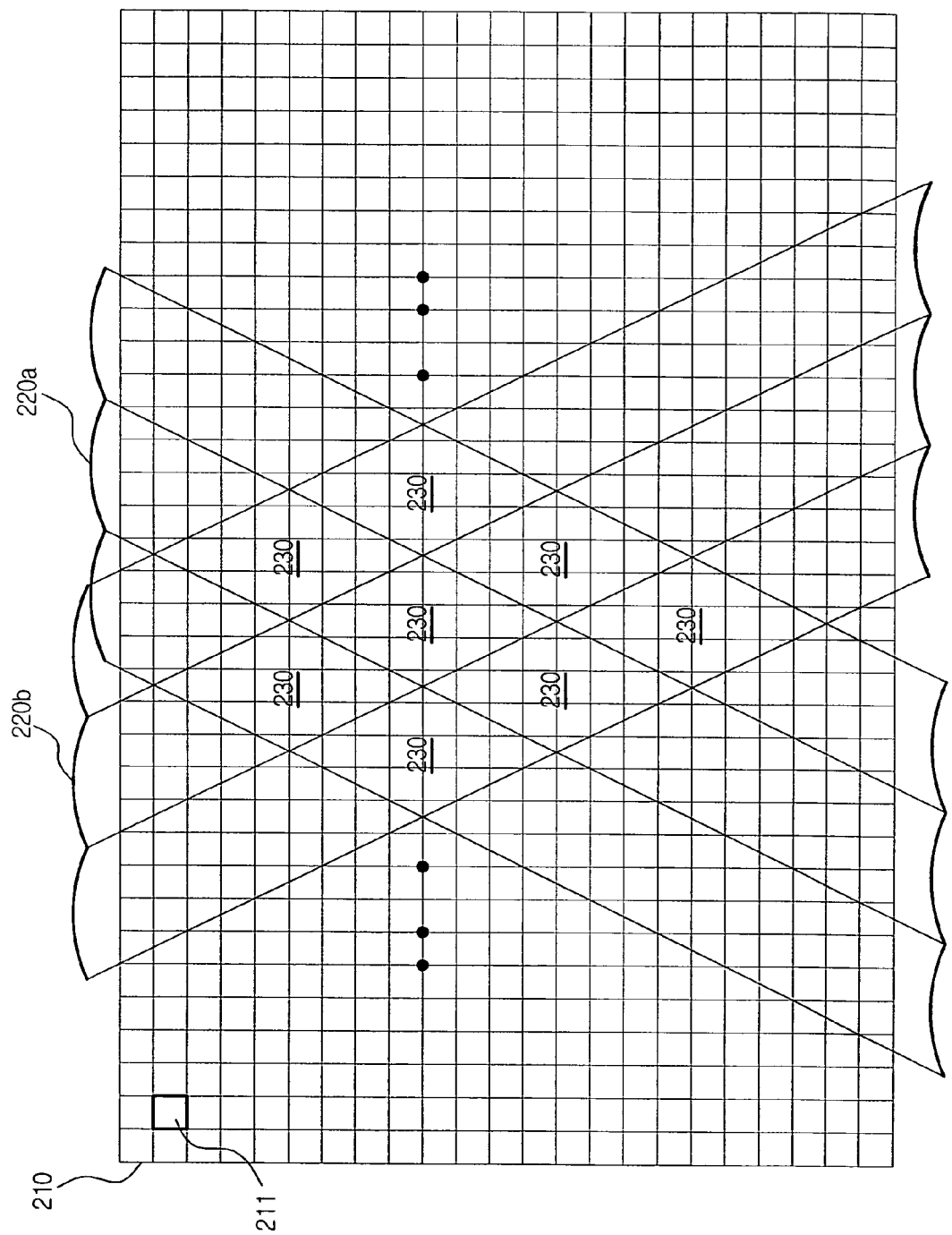
FIG. 1 is a view showing an image display panel and optical plates overlapped thereon, which are included in a three-dimensional image display apparatus according to an embodiment of the present invention.

Hereinafter, embodiments of the present invention will be described in detail with reference to the attached drawings.

Reference now should be made to the drawings, in which the same reference numerals are used throughout the different drawings to designate the same or similar components.

FIG. 1 is a view showing an image display panel 210 and optical plates 220a and 220b overlapped thereon, which are included in a three-dimensional image display apparatus according to an embodiment of the present invention.

The image display panel 210 is a display unit in which pixels 211 are arranged in a checkerboard pattern and to which a Liquid Crystal Display (LCD), etc. belong. The optical plates 220a and 220b are preferably lenticular plates or parallax barriers. Such a lenticular plate is an optical plate on which a plurality of semi-cylindrical lenses are arranged and which has repetitive striped (straight line) patterns formed by the semi-cylindrical lenses. Slants of the linear patterns of the optical plates 220a and 220b are varied with the arrangement directions of the optical plates 220a and 220b.

The two optical plates 220a and 220b having different arrangement directions are overlapped with each other on the image display panel 210, so that rhombus patterns 230 may be formed on the image display panel 210. In this case, if an angle at which the optical plates 220a and 220b are overlapped is adjusted, the shape or vertex angle of the formed rhombus patterns may be varied.

The present invention relates to a software-structured image processing method of forming pixel cells for three-dimensional image display by arranging the pixels 211 on the image display panel 210 to correspond to patterns (for example, rhombus patterns or rectangular patterns) formed by the repetitive patterns of the optical plates 220a and 220b arranged on the image display panel 210 to be overlapped with each other, and providing a suitable three-dimensional image to the formed pixel cells. More particularly, the present invention regards the image display panel 210 as a figure having a checkerboard pattern in which unit patterns are vertically and horizontally arranged, and forms pixel cells each comprised of integer-numbered unit patterns on the image display panel 210 having the checkerboard pattern. The unit pattern represents a pattern formed by a single pixel 211.

Figure 2:
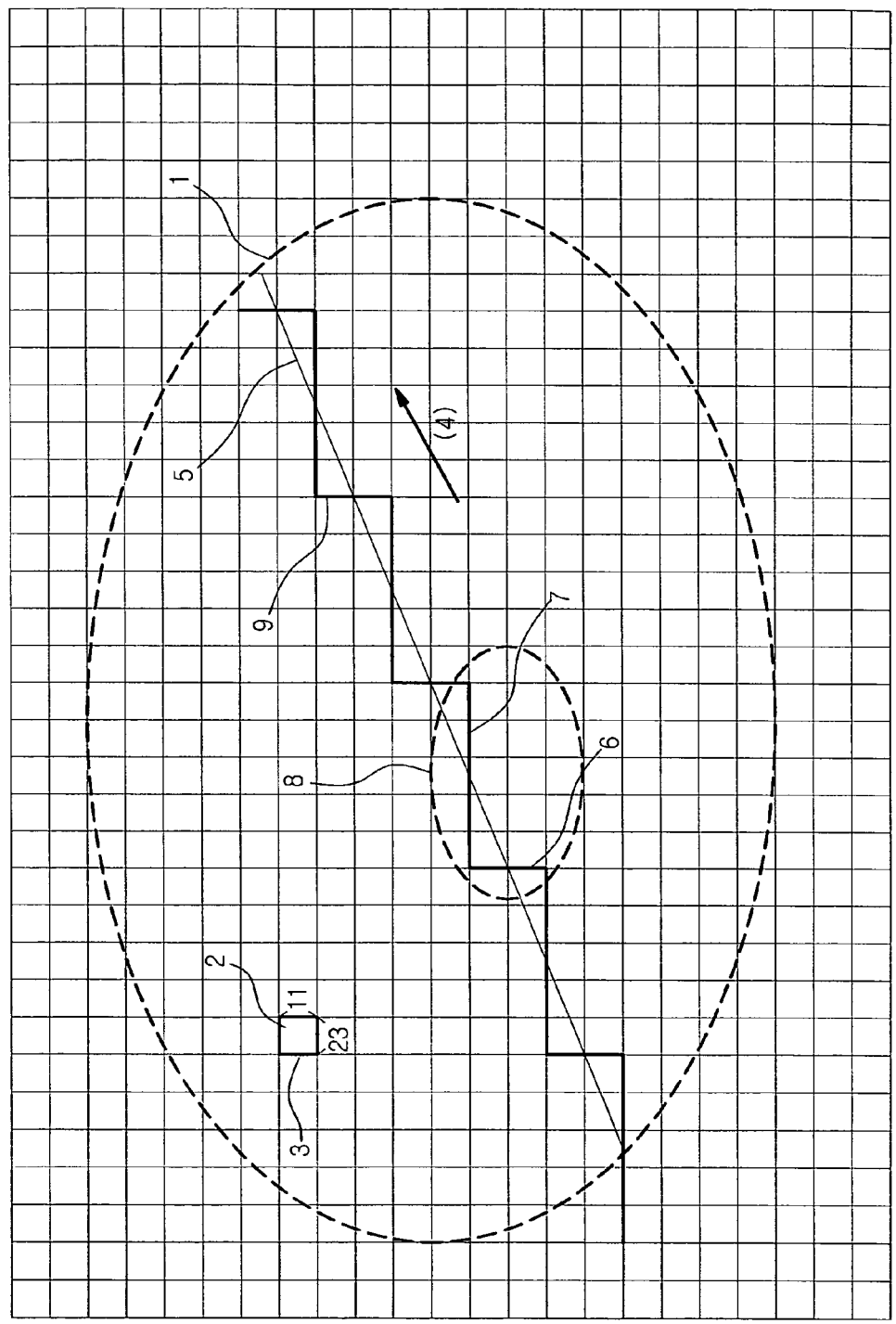
FIG. 2 is an example approximating a straight line with an arbitrary slant in a checkerboard pattern with a discrete line of a stepped pattern.

FIG. 2 is an example approximating a straight line with an arbitrary slant in a checkerboard pattern with a discrete line of a stepped pattern.

As described above, the image display panel may be regarded as a figure having the checkerboard pattern in which a plurality of unit patterns 2 are vertically and horizontally arranged. A straight line 5 is assumed to have an arbitrary direction 4, not vertical or horizontal direction, relative to one side 3 of a unit pattern 2 in the checkerboard pattern 1, and is also assumed to have a slant of i/j, where i and j are preferably integers.

The straight line 5 can be approximated by a discrete line 9 formed by connecting a plurality of stepped patterns 8 each having a vertical increment 6 corresponding to the height of i unit patterns 2 and a horizontal increment 7 corresponding to the width of j unit patterns 2 continuously. If the height 11 and the width 23 of one unit pattern 2 are different, an actual slant is calculated by multiplying a ratio of the height 11 to the width 23 by i/j. In the present specification, it is assumed that the ratio of the height 11 to the width 23 is "1". That is, the unit pattern 2 is assumed to be a square.

In order to obtain the discrete line 9 comprised of stepped patterns closest to the straight line 5, it is preferable that, of unit patterns divided by the straight line 5, unit patterns each having an area of equal to or greater than half of a total unit pattern area under the straight line 5, are located below the discrete line 9, and the remaining unit patterns of which each has an area of equal to or greater than half of a total unit pattern area above the straight line 5, are located above the discrete line 9.

For this operation, it may be preferable to implement the discrete line 9 using two or more stepped patterns having different slants, not a single stepped pattern. Therefore, even when i/j is 1/2, stepped patterns obtained with respect to the cases where i=1 and j=2 and where i=2 and j=4 may be different from each other.

Figure 3:
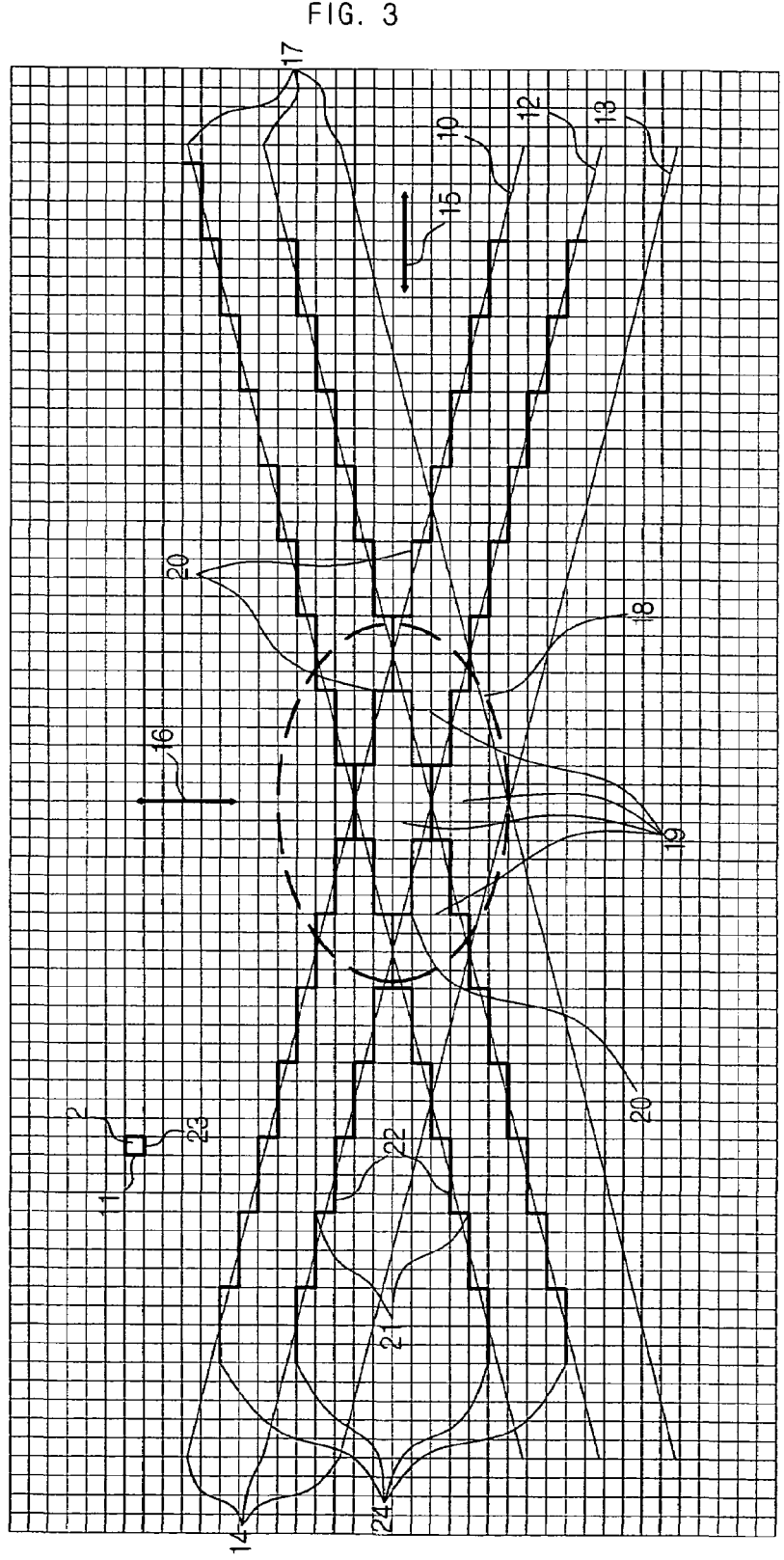
FIG. 3 is a view showing integer-numbered unit patterns arranged within rhombus patterns formed by the overlap of the first straight line group arranged in parallel and regularly spaced with a particular slant and the second straight line group arranged in vertically or horizontally therewith in a checkerboard pattern.

FIG. 3 is a view showing integer-numbered unit patterns arranged within rhombus patterns formed by the overlap of first and second straight line groups 14 and 17 in a checkerboard pattern. In this case, the straight lines in the first straight line group 14 having an arbitrary slant are arranged in parallel while being spaced apart from each other by a certain distance. Straight lines in the second straight line group 17 are horizontally or vertically symmetrical with those in the first straight line group 14.

It is assumed that the first straight line group 14 includes a straight line 10 with a slant of −1/4, a straight line 12 spaced apart from the straight line 10 in parallel by a distance corresponding to four times the height 11 of the unit pattern 2, and a straight line 13 spaced apart from the straight line 10 in parallel by a distance corresponding to eight times the height 11 of the unit pattern 2. The second straight line group 17 is symmetrical with the first straight line group 14 in a horizontal direction 15 or a vertical direction 16. On an area 18 in which the first and second straight line groups 14 and 17 overlap with each other and then intersect, four rhombuses 19 having a predetermined vertex angle and having the same size and shape are formed by the first and second straight line groups 14 and 17.

If a profile is drawn in each of the rhombuses 19 so that, of unit patterns divided by the straight line groups 14 and 17, unit patterns each with a division, an area of equal to or greater than half of a total unit pattern area and belongs to the rhombus 19, are included in the profile, the shape of the profile becomes a crisscross pattern 20 having a horizontal width three times a vertical height. If the straight lines in the first and second straight line groups 14 and 17 are approximated using stepped discrete lines 24 each having a vertical increment (or vertical decrement) 21 identical with the height 11 of the unit pattern 2 and a horizontal increment 22 four times the width 23 of the unit pattern 2, each pattern formed by the discrete lines 24 is exactly identical with the crisscross pattern 20.

FIGS. 4a to 4d illustrate discrete lines having stepped patterns used to approximate straight lines with different slants.

Figure 4A:
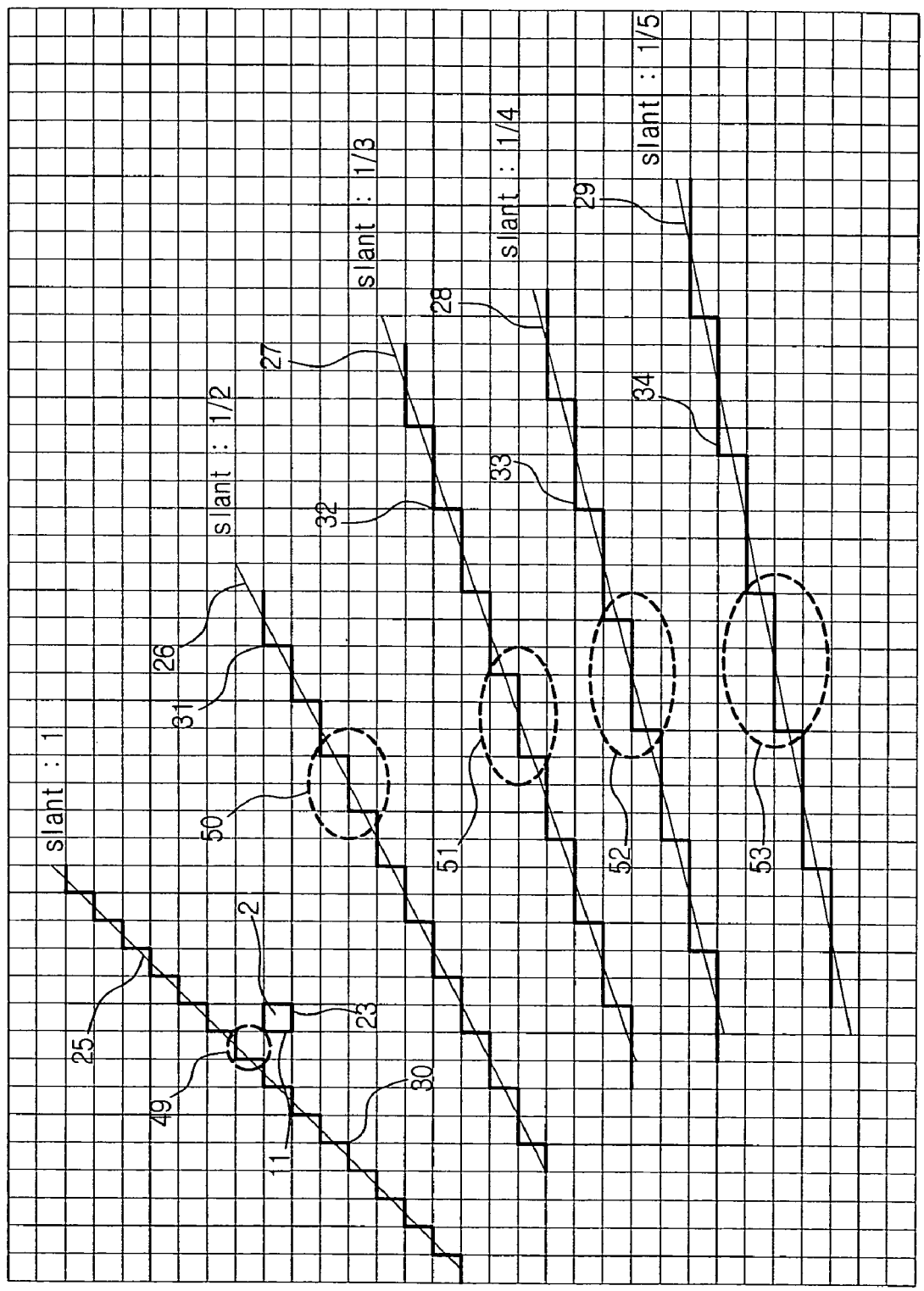
FIGS. 4a to 4d is discrete lines having stepped patterns used to approximate straight lines with different slants.

Referring to FIG. 4a, a straight line 25 with a slant of 1 can be approximated by a discrete line 30 comprised of stepped patterns 49 each having a vertical increment and a horizontal increment corresponding to the height 11 and the width 23 of the unit pattern 2, respectively. It is noted that the discrete line 30 is identical to a profile of unit patterns each having an area of equal to or greater than half of a total unit pattern area being under the straight line 25, among unit patterns divided by the straight line 25.

Straight lines 26, 27, 28 and 29 having slants of i/j (j=2, 3, 4 and 5) can be approximated by discrete lines implemented using stepped patterns 50, 51, 52 and 53, respectively. The stepped patterns 50 to 53 have vertical increments identical with the height 11 of the unit pattern 2, and have horizontal increments, which are two, three, four and five times the width 23 of the unit pattern 2, respectively. Stepped discrete lines 31 to 34 closest to the straight lines 26 to 29, respectively, are obtained by drawing profiles using unit patterns each having an area of equal to or greater than half of a total unit pattern area under the straight lines 26, 27, 28, and 29 and, among the unit patterns divided by the straight lines 26 to 29, as the stepped discrete lines corresponding to the straight lines 26 to 29, respectively.

In this case, the straight lines 26 to 29 become the lines obtained by connecting points corresponding to 1/2 of the horizontal widths of respective stepped patterns.

Figure 4B:
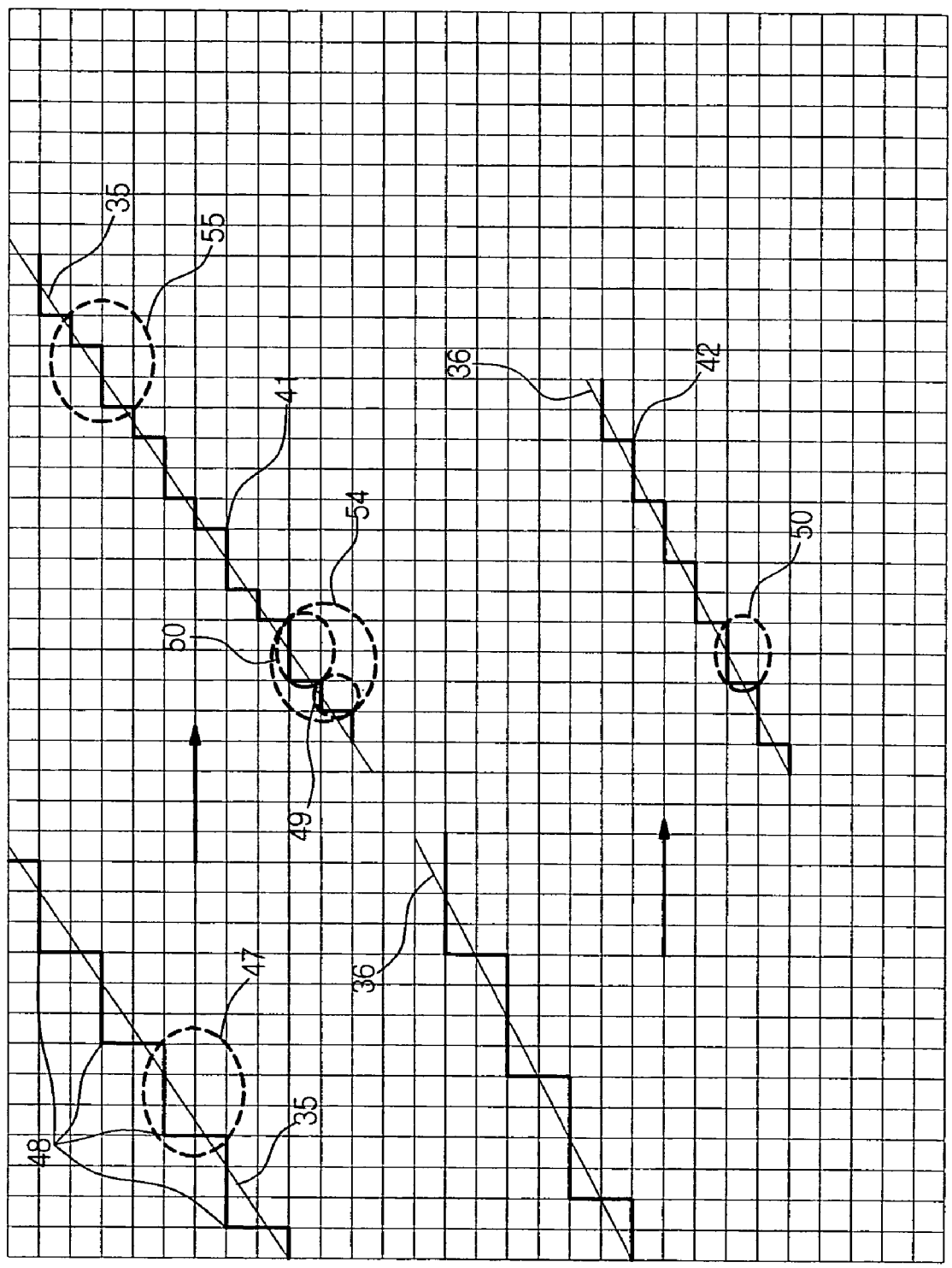
Figure 4C:
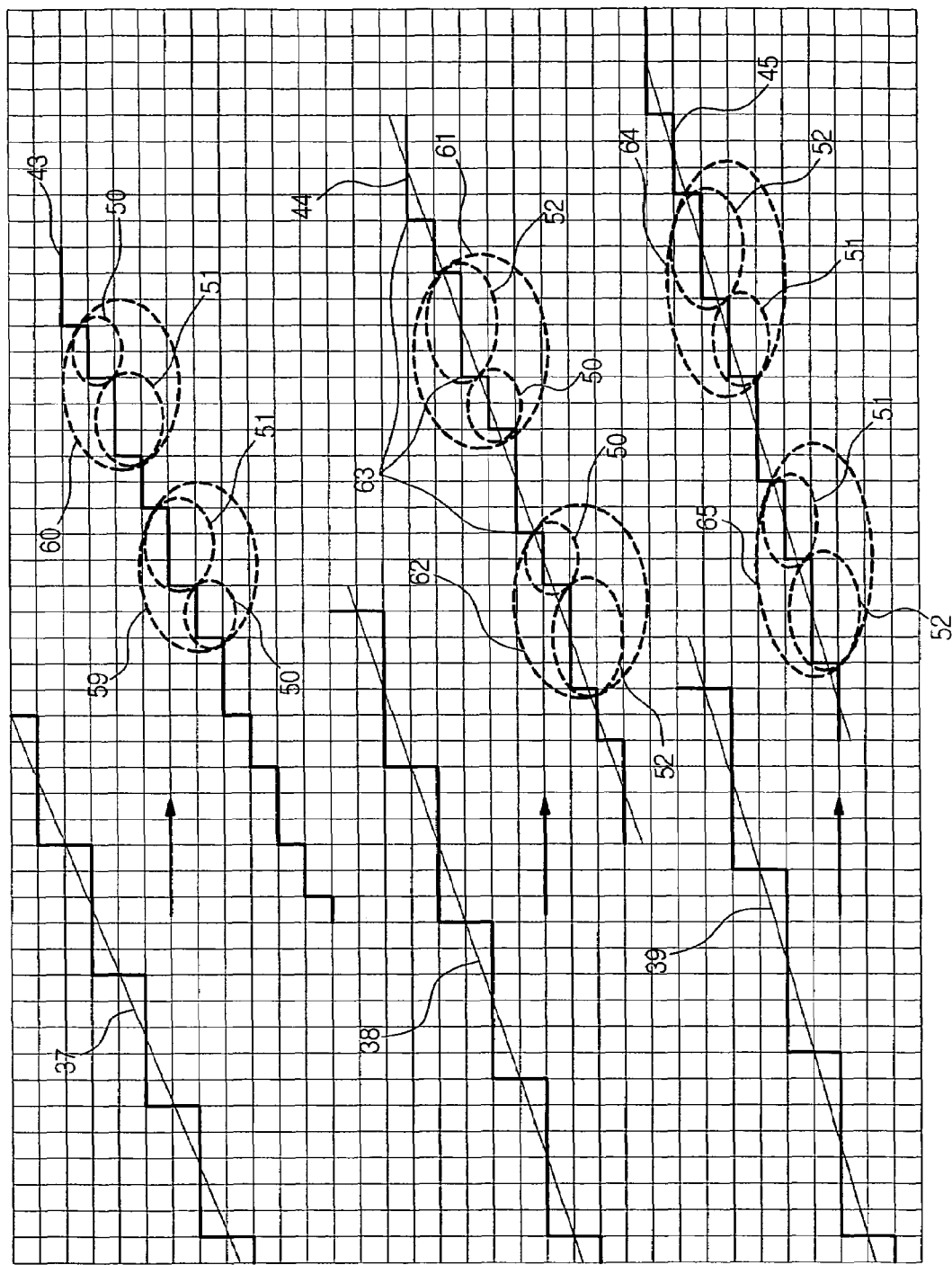
Figure 4D:
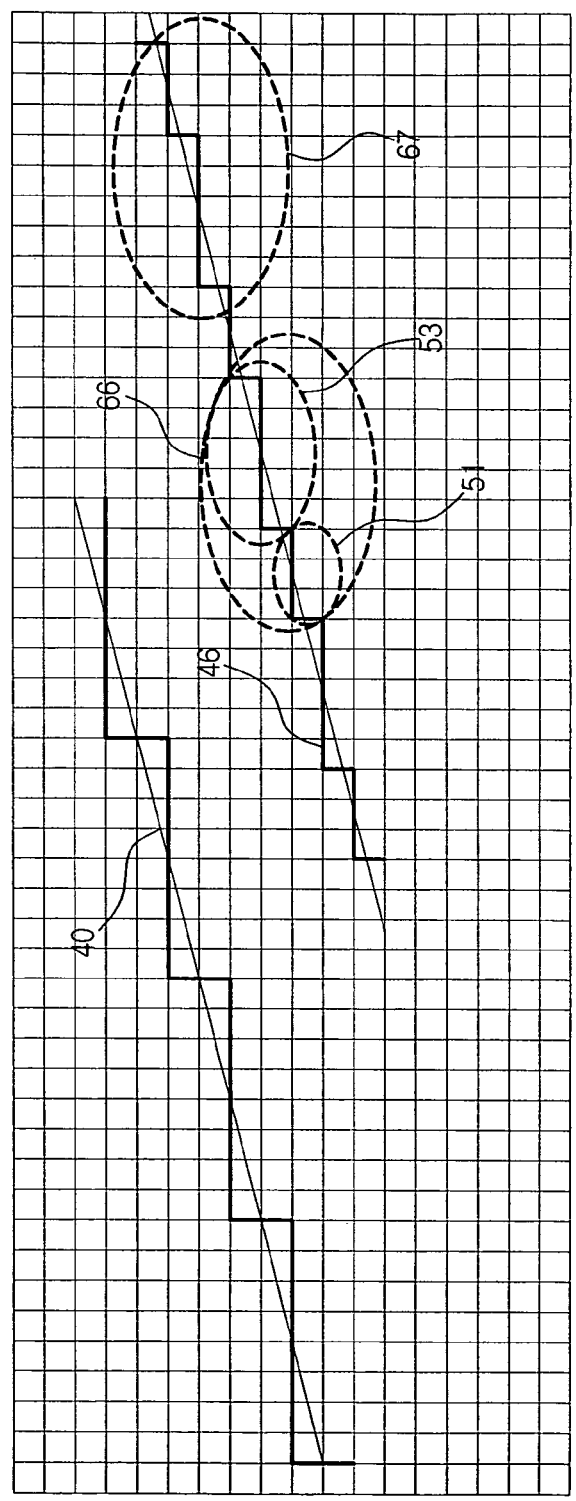

FIGS. 4b to 4d illustrate discrete lines to approximate straight lines with slants of 2/j (j=3, 4, 5 and 6). In FIGS. 4b to 4d, it is preferable to use two or more stepped patterns rather than one stepped pattern so as to perform approximation closest to a straight line.

Referring to FIG. 4b, a straight line 35 represents a line at j=3. That is, the slant of the straight line 35 is given by 2(vertical increment or decrement)/3(horizontal increment). If the straight line 35 is approximated by stepped patterns 47 each having a height two times the height 11 of the unit pattern 2 and a width three times the width 23 of the unit pattern 2, unit patterns 48 located at vertexes of each stepped pattern are included the stepped patterns 47 even though an area of equal to or greater than half of a total unit pattern area is located above the straight line 35. Therefore, this approximation cannot be considered to be suitable.

Therefore, as shown on the right side of FIG. 4b, it is preferable to approximate the straight line 35 by a discrete line 41 comprised of stepped patterns 54 each obtained by continuously connecting a first sub stepped pattern 49 and a second sub stepped pattern 50, or stepped patterns 55 each obtained by inversely connecting the first and second sub stepped patterns 49 and 50. The first sub stepped pattern 49 is a stepped pattern implemented using a single unit pattern, and the second sub stepped pattern 50 is a stepped pattern having a height identical with that of the unit pattern and a width two times that of the unit pattern. That is, the first sub-stepped pattern 49 is a stepped pattern with a height/width of 1/1 and the second sub-stepped pattern 50 is a stepped pattern with a height/width of 1/2. Therefore, it is preferable to approximate a straight line at i=2 by a discrete line implemented using two sub stepped patterns with a height/width of 1/g and 1/h, respectively, (where g and h are integers and g+h=j). Properly, when a straight line with a predetermined slant is approximated, two or more sub-stepped patterns can be used.

A straight line 36 at j=4 can be approximated by a discrete line 42 comprised of the second sub stepped patterns 50.

Referring to FIG. 4c, a straight line 37 at j=5 (that is, 2/5) can be approximated by a discrete line 43 comprised of stepped patterns 59 each obtained by connecting the second sub stepped pattern 50 and a third sub stepped pattern 51, or stepped patterns 60 each obtained by inversely connecting the second and third sub stepped patterns 50 and 51. A straight line 38 at j=6 (that is, 2/6) can be approximated by a discrete line 44 comprised of stepped patterns 61 each obtained by connecting the second sub stepped pattern 50 and a fourth sub stepped pattern 52, or stepped patterns 62 each obtained by inversely connecting the second and fourth sub stepped patterns 50 and 52. The fourth sub-stepped pattern 52 is a stepped pattern with a height/width of 1/4. In this case, an area of each of unit patterns 63 placed at vertexes of the sub stepped patterns 52 is equally divided into two parts by the straight line 38. A straight line 39 at j=7 (that is, 2/7) can be approximated by a discrete line 45 comprised of stepped patterns 64 each obtained by connecting the third sub stepped pattern 51 and the fourth sub stepped pattern 52, or stepped patterns 65 each obtained by inversely connecting the third and fourth sub stepped patterns 51 and 52.

Referring to FIG. 4d, a straight line 40 at j=8 (that is, 2/8) can be approximated by a discrete line 46 comprised of stepped patterns 66 each obtained by connecting the third sub stepped pattern 51 and a fifth sub stepped pattern 53, or stepped patterns 67 each obtained by inversely connecting the third and fifth sub stepped patterns 51 and 53. The fifth sub-stepped pattern 53 is a stepped pattern with a height/width of 1/5. For straight lines at j>8, the above-described approximation can be equally applied.

A case where i is greater than 2 is similar to a case where j is greater than 2. If the straight lines shown in FIGS. 4a to 4d and the discrete lines corresponding thereto are rotated 90°, i/j becomes j/i. Therefore, regardless of a slant of i/j or j/i, there is no difference in methods of approximating straight lines by discrete lines.

Figure 5:
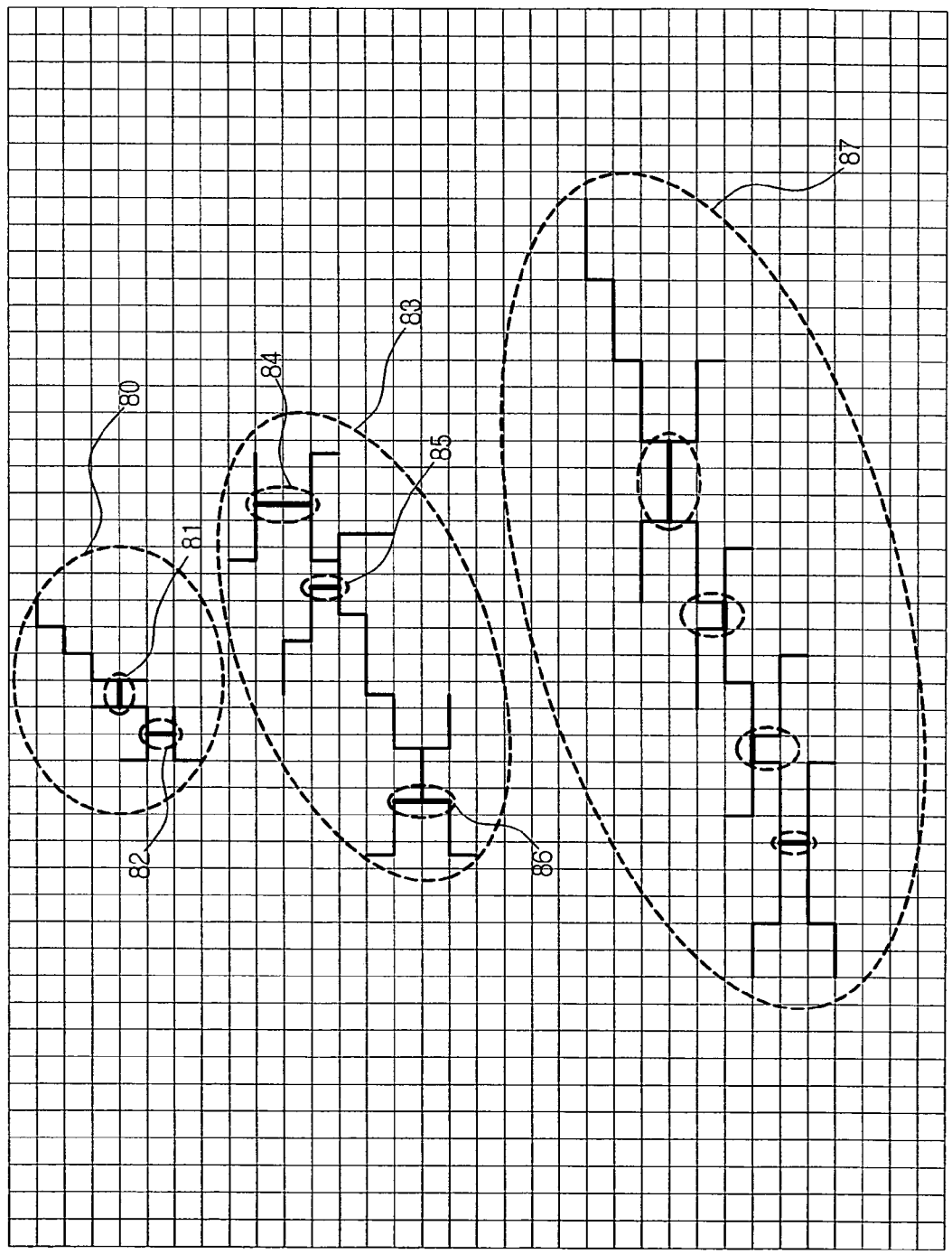
FIG. 5 is a shape intersecting discrete lines with different slants shown in FIGS. 4a to 4d.

FIG. 5 is a shape intersecting discrete lines with different slants shown in FIGS. 4a to 4d. In a case 80 where a discrete line with a slant of +1 and a discrete line with a slant of −1 intersect, there are two shapes: a shape 81 in which stepped patterns of the two discrete lines horizontally overlap with each other, and a shape 82 in which the stepped patterns thereof vertically overlap with each other. Further, in a case 83 where two discrete lines with slants of ±1/2 intersect, there are three shapes: a shape 84 in which heights of stepped patterns overlap with each other, and shapes 85 and 86 in which the stepped patterns overlap with each other while unit patterns shift horizontally by one.

In a case 87 where two discrete lines with slants of ±1/3 intersect, there are four shapes because three unit patterns exist in a horizontal direction. Therefore, if slants are ±1/j, there are j+1 cases where discrete lines intersect. In a case where a discrete line with a specific slant of 1/j and a discrete line obtained by rotating the discrete line at 90 degrees intersect, there are j+1 shapes. For example, in a case where discrete lines with slants of 1/h and 1/g intersect, there are h*g shapes. Further, in a case where discrete lines with slants of ±2/j intersect, there are 2j shapes.

FIGS. 6a to 6f illustrate integer-numbered unit patterns arranged within cell patterns with rhombus-shaped profiles formed by the overlap of the discrete lines shown in FIGS. 4a to 4d.

Figure 6A:
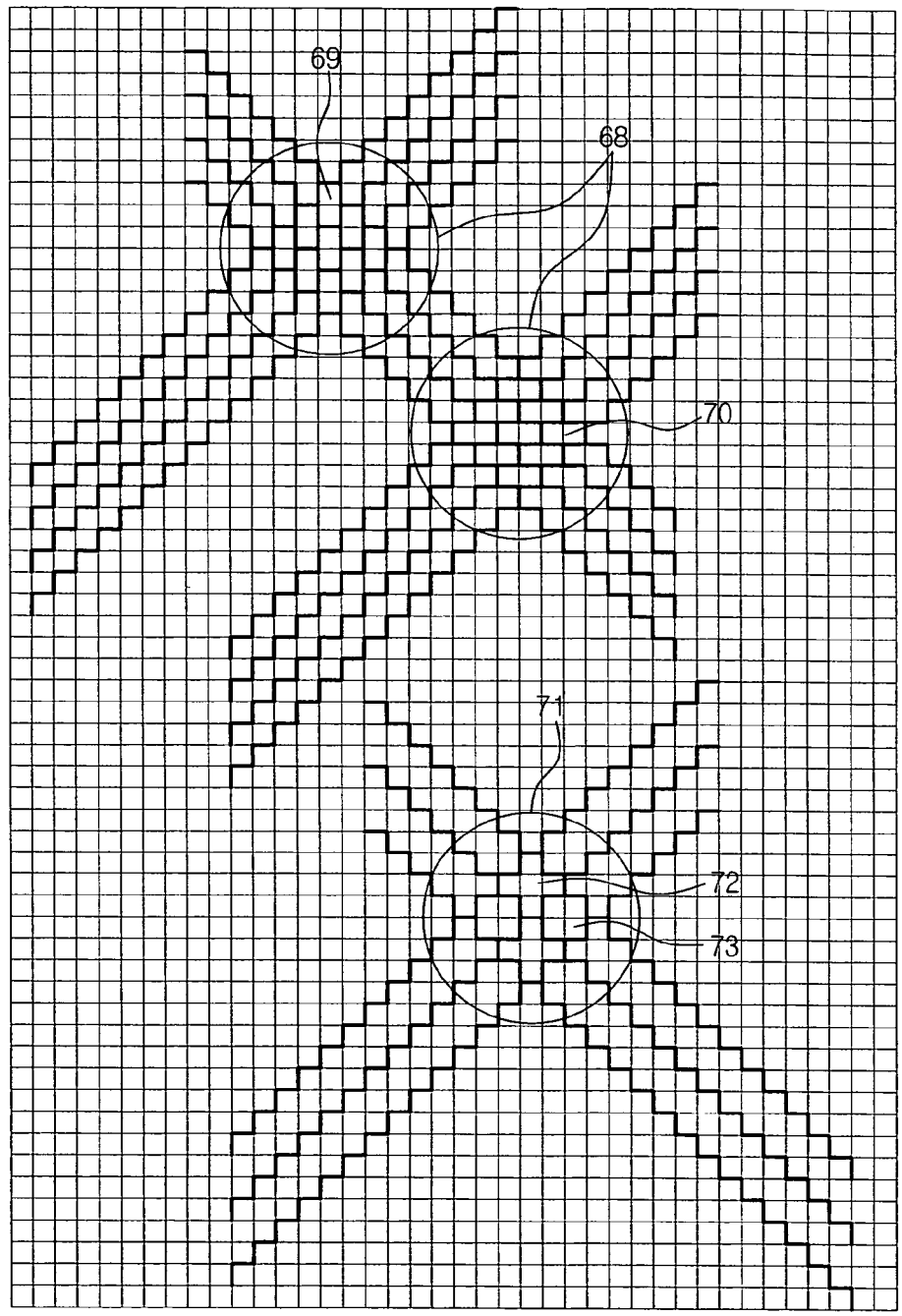
FIGS. 6a to 6f illustrate integer-numbered unit patterns arranged within cell patterns with rhombus-shaped profiles formed by the overlap of the discrete lines shown in FIGS. 4a to 4d.
Figure 6B:
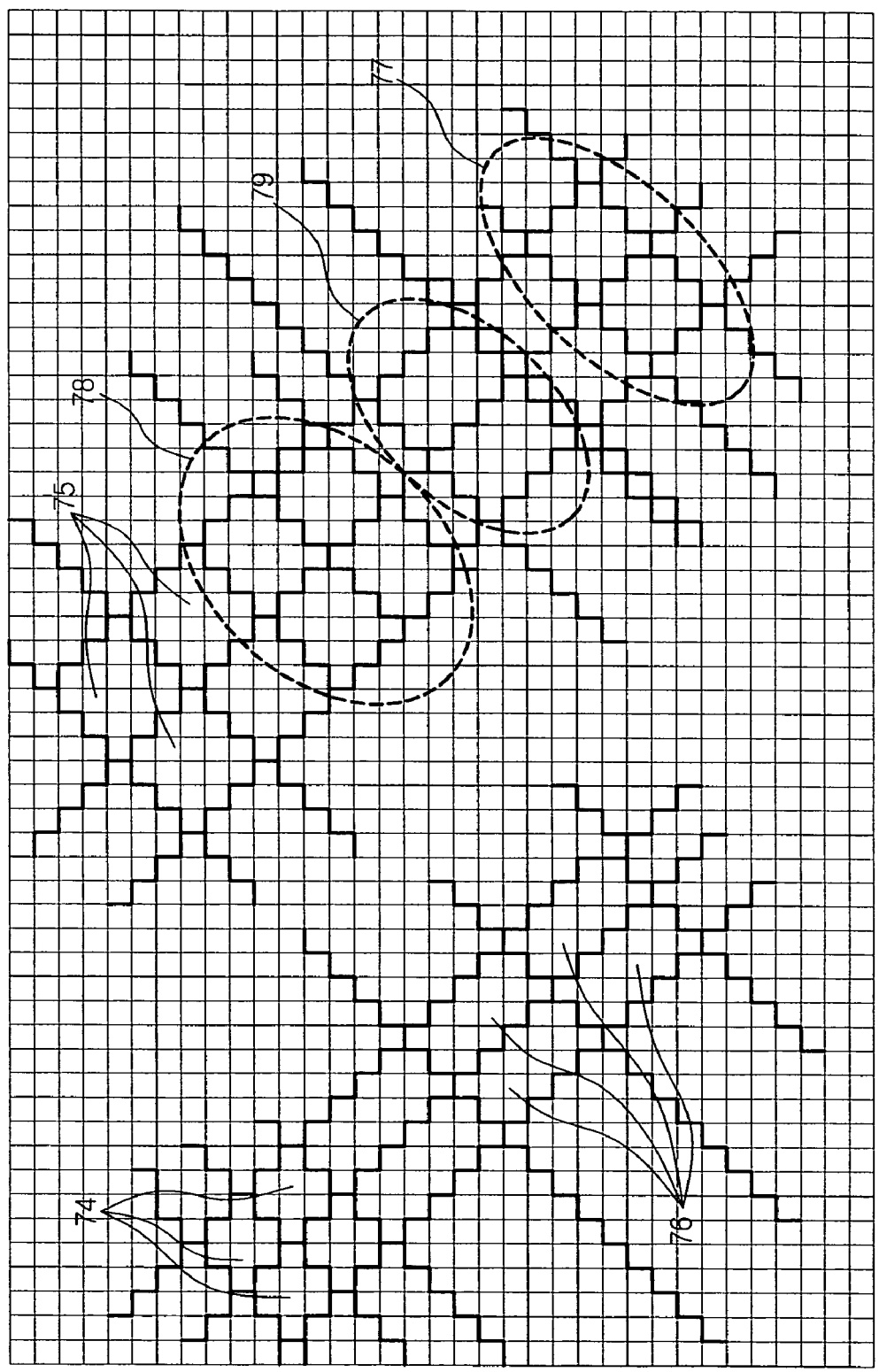

FIGS. 6a and 6b illustrate cases where discrete lines with a slant of +1 are vertically arranged at intervals of N unit patterns, discrete lines with a slant of −1 are vertically arranged at intervals of M unit patterns, and the discrete lines overlap with each other. Cell patterns having a rhombus-shaped, rectangular or crisscross profile are formed due to the overlap of the discrete lines with slants of +1 and −1. Integer-numbered unit patterns are arranged within each of the cell patterns.

Referring to FIG. 6a, at N=M=2, cell patterns 69 in which two unit patterns are vertically arranged and cell patterns 70 in which two unit patterns are horizontally arranged may be formed in overlap regions 68. The two types of cell patterns 69 and 70 correspond to each other if the overlap regions 68 are rotated at 90 degrees.

At N=M=3, crisscross cell patterns 72 and square cell patterns 73 are formed together in an overlap region 71. This case is not suitable for a pixel cell because two types of cell patterns are formed together.

Referring to FIG. 6b, at N=M=4, there are formed cell patterns 74 in which the number of unit patterns arranged horizontally or vertically within a single cell pattern is four and which have rhombus-shaped profiles. At N=M=6, there are formed cell patterns 75 in which the number of unit patterns arranged horizontally or vertically within a single cell pattern is six and which have rhombus-shaped profiles. At N=6 and M=4, there are formed cell patterns 76 having slightly distorted rectangular profiles. Cell patterns 77 formed at N=M=5, cell patterns 78 at N=6 and M=5 and cell patterns 79 at N=7 and M=5 are also shown in FIG. 6b.

Figure 6C:
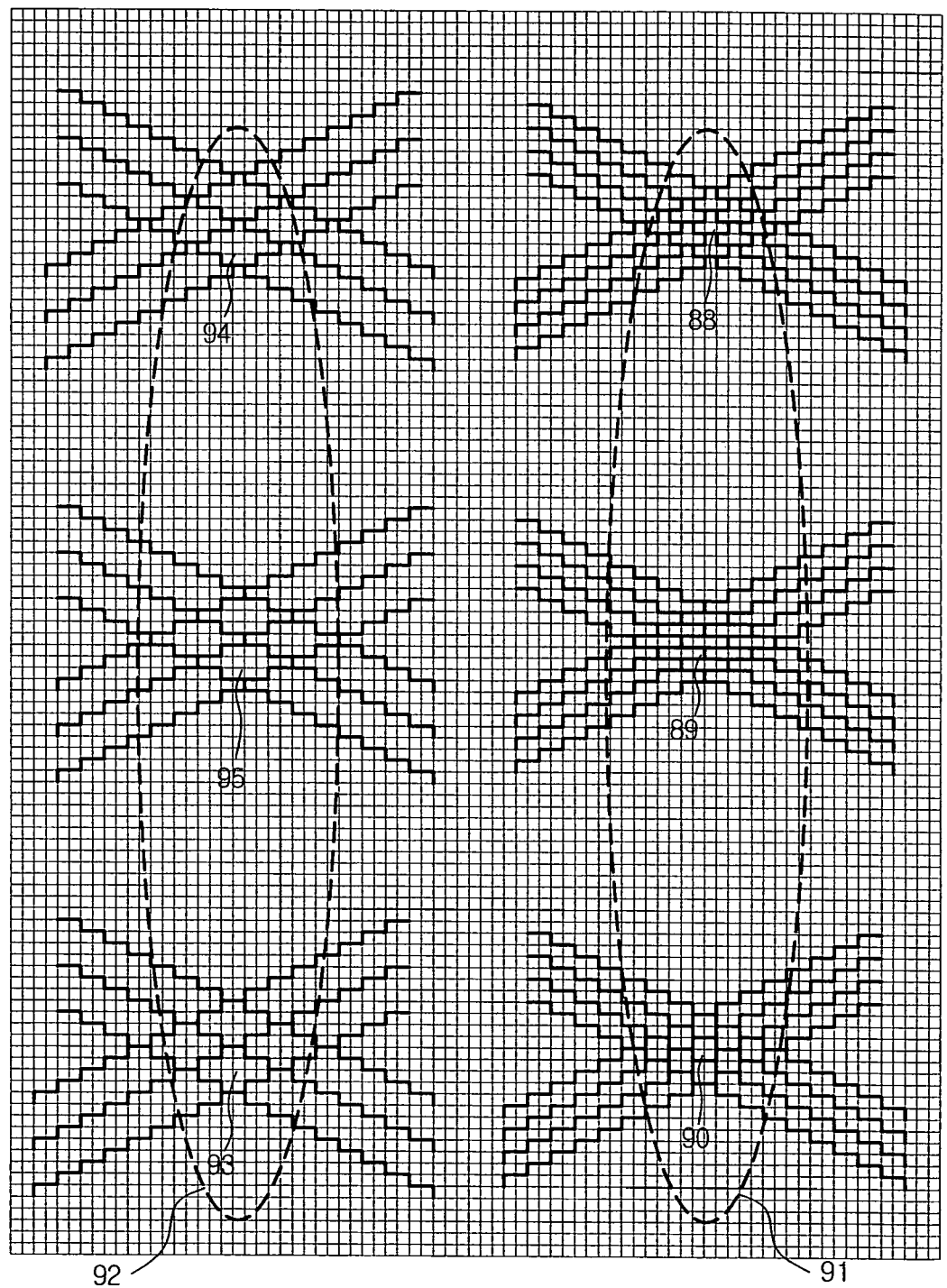

FIG. 6c illustrate a case where discrete lines with a slant of +1/2 and discrete lines with a slant of −1/2 are vertically arranged at intervals of N and M unit patterns, respectively, and they overlap with each other.

Referring to FIG. 6c, if slants are ±1/2, there are three shapes in which the discrete lines intersect, so that three types of cell patterns 88, 89 and 90 and three types of cell patterns 93, 94 and 95 can be formed with respect to a case 91 where N=M=2 and a case 92 where N=M=4, respectively.

Figure 6D:
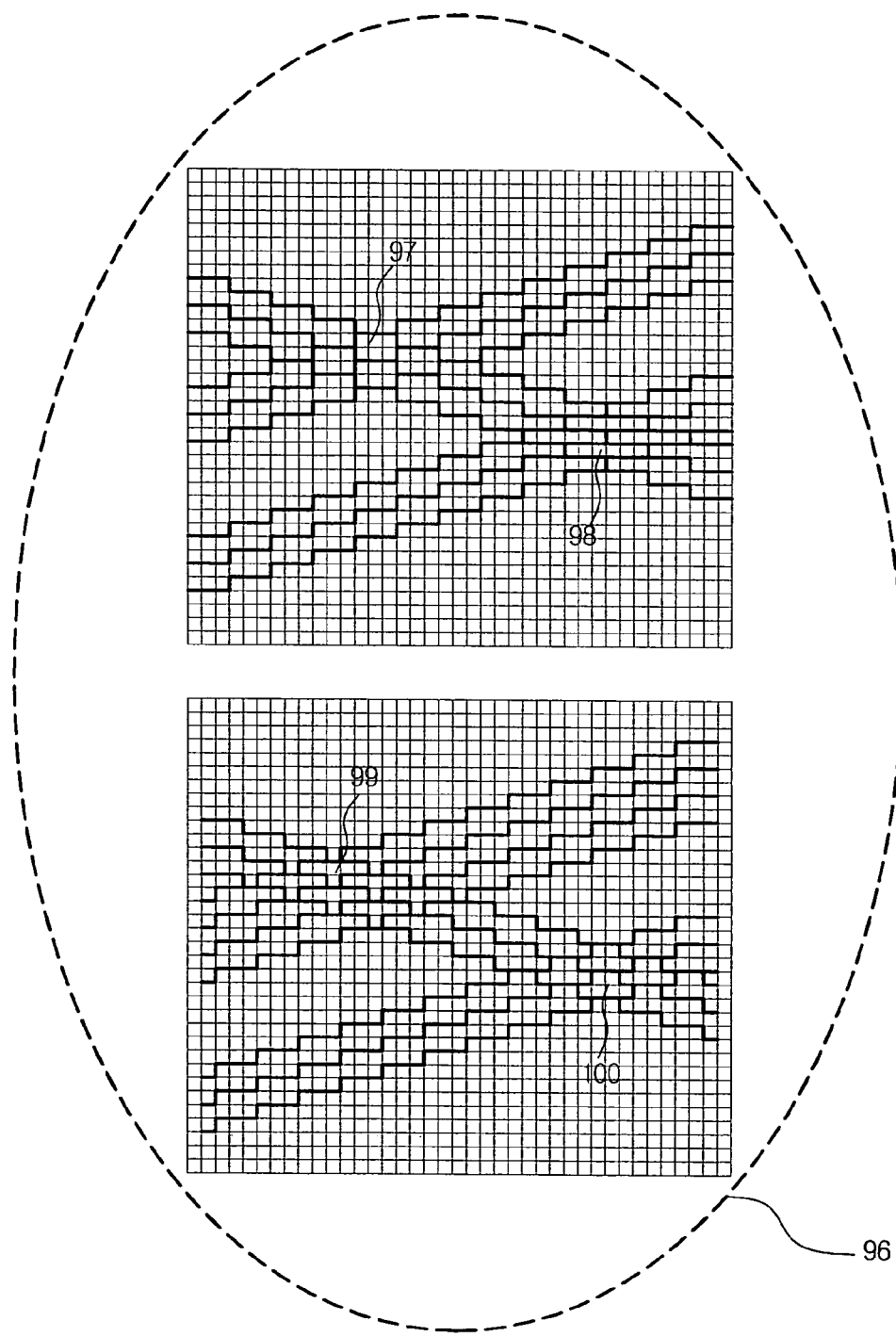
Figure 6E:
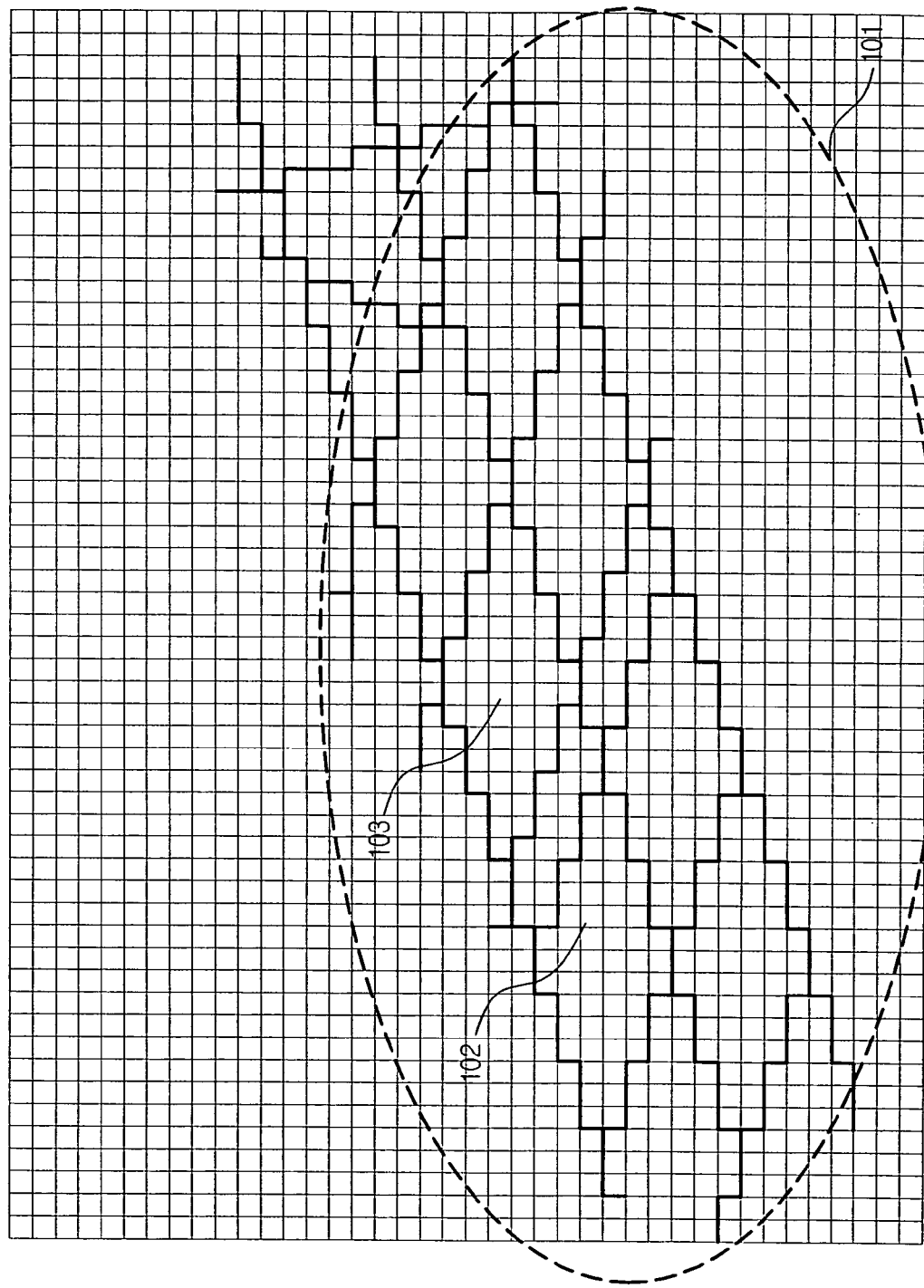
Figure 6F:
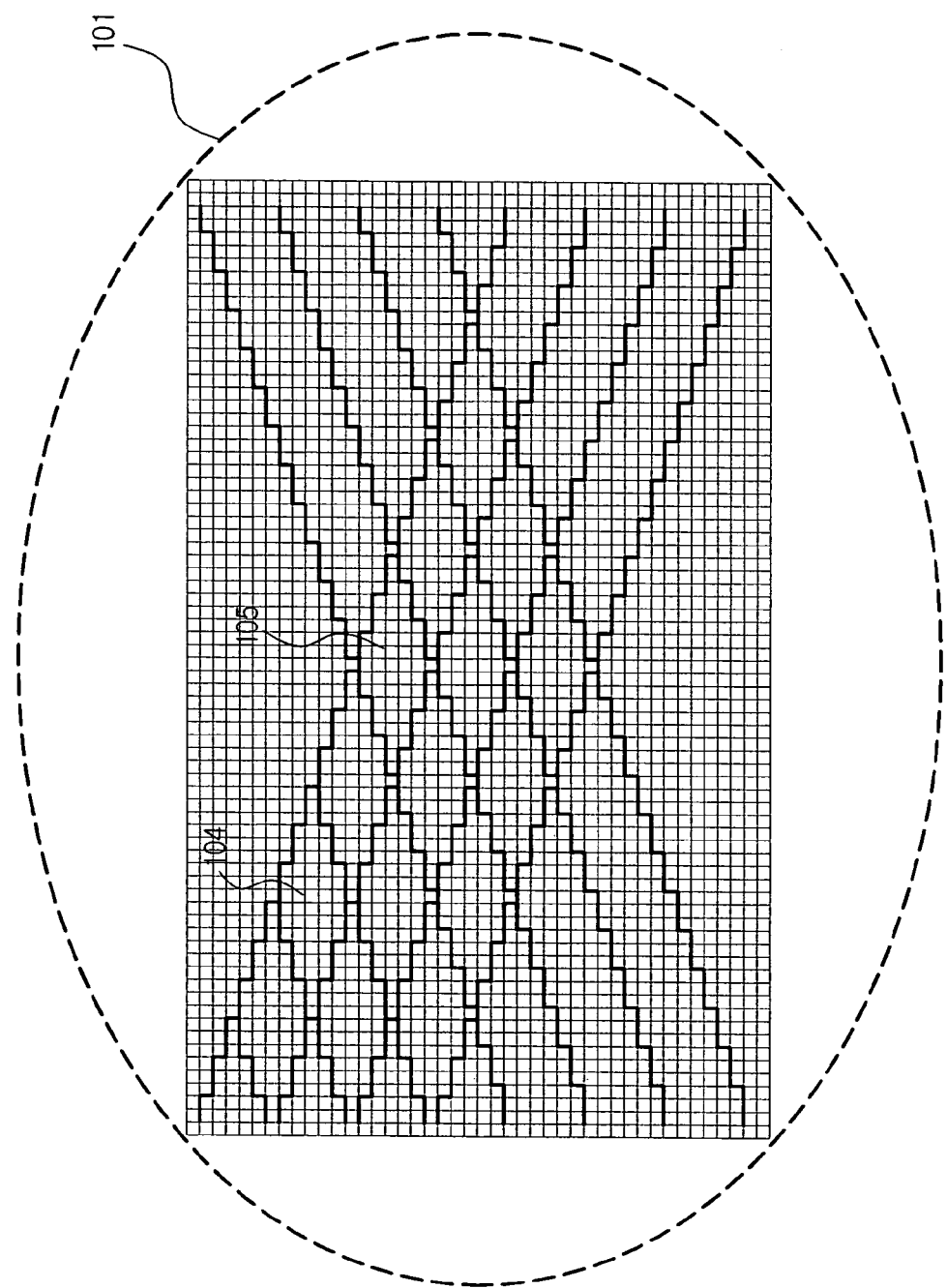

FIGS. 6d to 6f illustrate cases where discrete lines with slants of +1/3 and −1/3 are vertically arranged at intervals of N and M unit patterns, respectively, and they overlap with other. If slants are ±1/3, there are four shapes in which the discrete lines intersect. Therefore, referring to FIG. 6d, in a case 96 where N=M=2, four types of cell patterns 97, 98, 99 and 100 can be formed. Referring to FIGS. 6e and 6f, in a case 101 where N=M=6, four types of cell patterns 102, 103, 104 and 105 can be formed.

Figure 7:
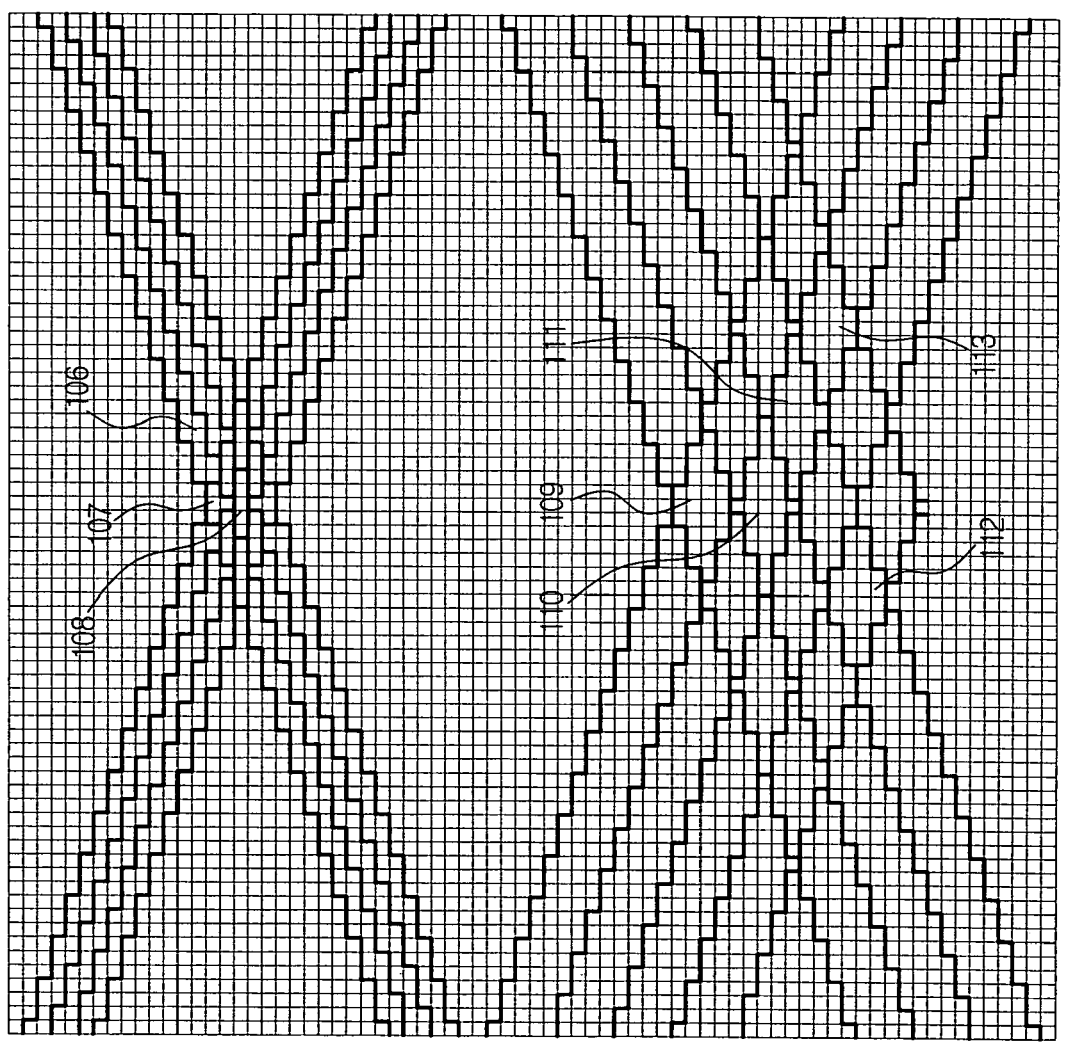
FIG. 7 illustrates unit patterns arranged within cell patterns having rhombus-shaped profiles formed when discrete lines arranged at regular intervals are shifted by one unit pattern.

FIG. 7 illustrates unit patterns arranged within cell patterns having rhombus-shaped profiles formed when discrete lines arranged at regular intervals are shifted by one unit pattern.

When discrete lines with slants of ±1/3 overlap with each other at N=M=2, three types of cell patterns 106, 107 and 108 are formed together. At N=M=6, five types of cell patterns 109, 110, 111, 112 and 113 are formed together. Therefore, such shapes in which the discrete lines overlap with each other are not preferable to be actually used for pixel cells, because the cell patterns having different shapes are formed together.

Figure 8:
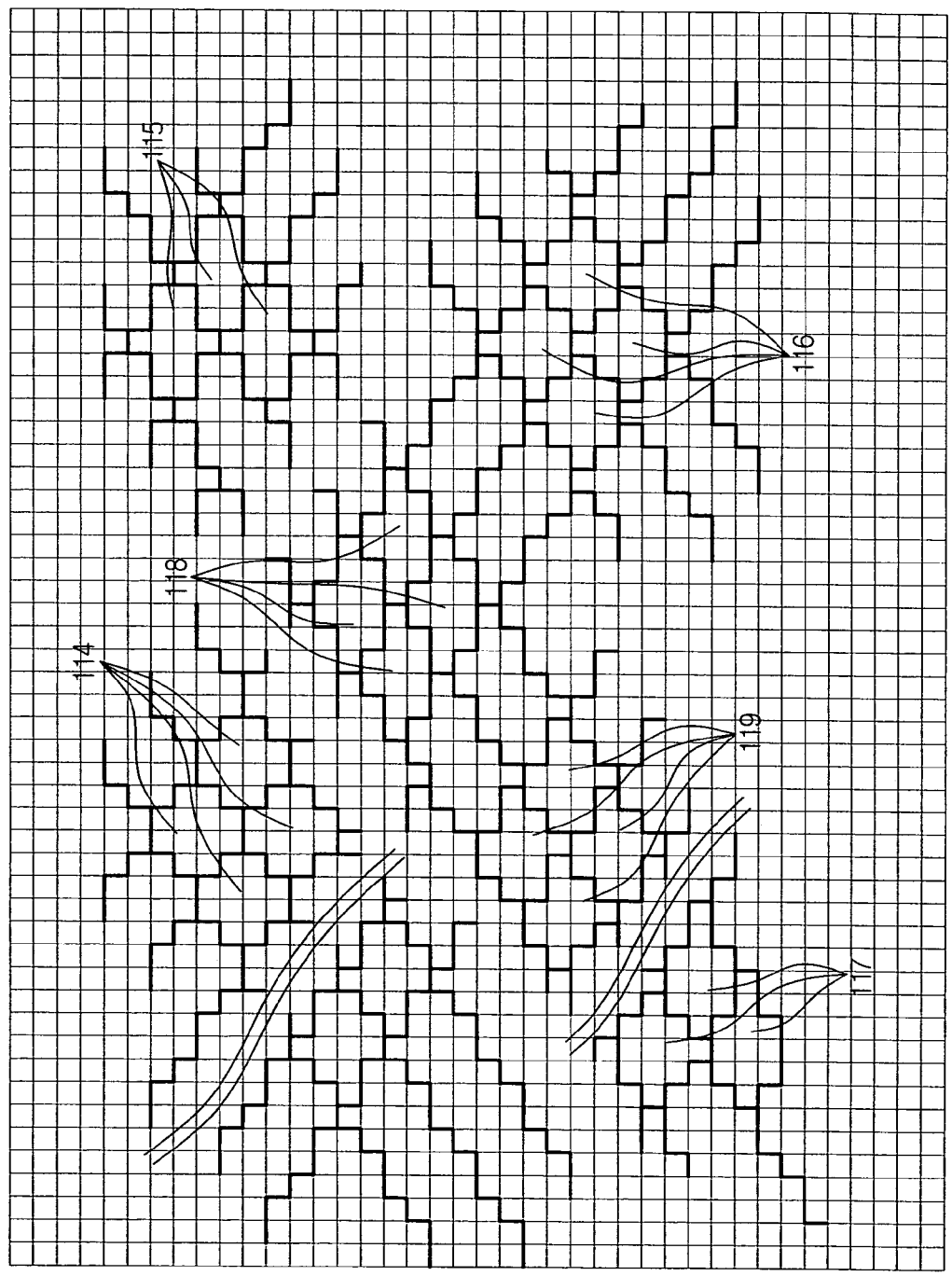
FIG. 8 illustrates unit patterns arranged within cell patterns having rhombus-shaped profiles formed when slants are ±2/3 and N=M=4.

FIG. 8 illustrates unit patterns arranged within cell patterns having rhombus-shaped profiles formed when slants are ±2/3 and N=M=4. In this case, six types of overlap shapes are formed as described above, so that six different cell patterns 114, 115, 116, 117, 118 and 119 are formed. But, if overlap-type is determined, all cell patterns formed by the determined overlap-type have same shape. Therefore, it may be preferable to use the cell patterns 114 to 119 for pixel cells.

As described above, the present invention implements pixel cells for three-dimensional image display by arranging integer-numbered unit patterns within each rhombus pattern formed by the overlap of optical plates on an image display panel in which pixels (one pixel forms a unit pattern) are arranged in a checkerboard pattern. For this operation, the above embodiments of the present invention approximate repetitive patterns (straight lines) of the optical plates using stepped patterns comprised of a number of vertical unit patterns and a number of horizontal unit patterns corresponding to the slants of the straight lines. If rhombus or rectangular patterns, formed by the repetitive straight line patterns of the optical plates, are used for pixel cells as they are without using the above-described stepped patterns, unit patterns on the image display panel, that is, pixels, may be divided by the straight line patterns of the optical plates. If one pixel is divided and inserted into two or more different pixel cells, positions of divided pixels in a viewing zone are different, thus deteriorating resolution of a three-dimensional image.

However, the present invention can prevent the deterioration of resolution of a three-dimensional image by implementing pixel cells similar to rhombus patterns formed by the straight line patterns of the optical plates using stepped patterns without dividing one pixel. Further, the present invention differently implements pixel cells according to the arrangement directions of optical plates arranged to be overlapped on an image display panel, thus implementing pixel cells capable of reducing a Moire pattern effect.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a method of implementing pixel cells for three-dimensional image display, which varies the shapes of pixel cells of multiple viewpoint images arranged on an image display panel in full parallax-type multiple viewpoint three-dimensional image display system depending on the arrangement directions of optical plates, thus improving the quality of a three-dimensional image degraded due to Moire patterns. Therefore, the present invention is advantageous in that it improves the quality of a three-dimensional image generated in a three-dimensional image display system, thus enhancing viewing conditions, such as by reducing eyestrain of viewers.

What is claimed is:

1. A method of forming pixel-cell in a three-dimensional image display system consisting of an image display panel having a plurality of unit patterns arranged in a vertical direction and horizontal direction and an optical plate having repetitive pattern, said method comprising:
determining each side of rhombus pattern having an arbitrary vertex angle as straight line having a predetermined slant;
calculating a number of unit patterns in vertical direction and a number of unit patterns in horizontal direction, both corresponding to the predetermined slant;
approximating the predetermined slant to stepped patterns with the number of unit patterns in vertical direction and the number of unit patterns in horizontal direction; and
forming the pixel cell by use of said stepped patterns, wherein at least one integer-numbered unit pattern is arranged in the pixel cell.

2. The method of claim 1, wherein said forming comprises:
approximating each side of the rhombus pattern to a discrete line formed by connecting the stepped patterns successively.

3. The method of claim 2, wherein said rhombus pattern is formed by two intersecting straight line groups having different slants, and wherein lines in each of the two intersecting straight line groups are arranged in parallel and regularly spaced.

4. The method of claim 2, wherein said pixel cell is bounded by discrete lines corresponding to two parallel sides of the rhombus pattern.

5. The method of claim 2, wherein said approximating the predetermined slant comprises:
determining the discrete line corresponding to each side of the rhombus pattern by connecting boundary lines of unit patterns, wherein each of the connected unit patterns is selected from among unit patterns that are divided by each side of the rhombus pattern and has an area of equal to or greater than the half area of unit pattern under each side of the rhombus pattern.

6. The method of claim 1, wherein said approximating comprises:
approximating the predetermined slant using stepped pattern formed by connecting j sub-stepped patterns each having width corresponding to the width of the unit pattern successively if i is greater than j; and
approximating the predetermined slant using stepped pattern formed by connecting i sub-stepped patterns each having width corresponding to the height of the unit pattern successively if j is greater than i,
where, i (positive integer) is the number of unit pattern in the vertical direction and j (positive integer) is the number of unit pattern in the horizontal direction.

7. The method of claim 1, further comprising:
incrementing an interval between two parallel sides of the rhombus pattern, while each slant of the two parallel sides is kept same.

8. The method of claim 1, wherein the number of shapes of said pixel cell is g(>1)*h(> 1) if said pixel cell is formed by intersecting the first group of straight lines arranged at intervals corresponding to height of M(integer greater than 1) unit patterns and the second group of straight lines arranged at intervals corresponding to height of N(integer greater than 1) unit patterns, wherein the first straight lines group had s slant corresponding to one unit pattern in vertical direction and g unit patterns in horizontal direction or a slant corresponding to g unit pattern in vertical direction and one unit patterns in horizontal direction, and wherein the second straight lines group has a slant corresponding to one unit pattern in vertical direction and h unit patterns in horizontal direction or a slant corresponding to h unit pattern in vertical direction and one unit patterns in horizontal direction.

9. The method of claim 1, wherein the number of shapes of said pixel cell is g+h, if said pixel cell is formed by overlapping the first straight lines group comprised of straight lines arranged at intervals corresponding to height of M(integer greater than 1) unit patterns and the second straight lines group horizontally or vertically symmetrical to the first straight line group, wherein the first straight lines group has a slant corresponding to one unit pattern in vertical direction and g(greater than 1) unit patterns in horizontal direction.

10. The method of claim 1, wherein the number of shapes of said pixel cell is 2*g (greater than 1), if said pixel cell is formed by overlapping the first straight lines group comprised of straight lines arranged at intervals corresponding to height of M(integer greater than 1) unit patterns and the second straight lines group horizontally or vertically symmetrical to the first straight line group, wherein the first straight lines group has a slant corresponding to two unit patterns in vertical direction and g(greater than 1) unit patterns in horizontal direction.

11. A three-dimensional image processing method in a three-dimensional image display system including an image display panel in which a plurality of unit patterns are arranged in a vertical direction and horizontal direction and at least two optical plates, having repetitive pattern, which are overlapped on the image display panel, the method comprising:
obtaining a number of unit pattern in vertical direction (thereafter, a first vertical unit pattern number) and a number of unit pattern in horizontal direction (thereafter, a first horizontal unit pattern number), corresponding to a slant of repetitive pattern of a first optical plate (thereafter, a first slant);
obtaining a number of unit pattern in vertical direction (thereafter, a second vertical unit pattern number) and a number of unit pattern in horizontal direction (thereafter, a second horizontal unit pattern number), corresponding to slant of repetitive pattern of a second optical plate (thereafter, a second slant);
approximating the repetitive pattern of the first optical plate using a first stepped pattern, wherein a horizontal direction length of the first stepped pattern corresponds to the first horizontal unit pattern number and a vertical direction height of the first stepped pattern corresponds to the first vertical unit pattern number; and
approximating the repetitive pattern of the second optical plate using a second stepped pattern, wherein a horizontal direction length of the second stepped pattern corresponds to the second horizontal unit pattern number and a vertical direction height of the second stepped pattern corresponds to the second vertical unit pattern number,
wherein cell pattern formed by overlapping the approximated repetitive pattern of the first optical plate and the approximated repetitive pattern of the second optical plate instead of rhombus cell pattern formed by overlapping the repetitive pattern of the first optical plate and the repetitive pattern of the second optical plate is used as pixel cell for displaying three-dimensional image.

12. The method of claim 11, wherein integer-numbered unit patterns are arranged in said pixel cell.

13. The method of claim 12, wherein said approximating the repetitive pattern of the first optical plate comprises forming the first stepped pattern by connecting sub stepped patterns more than 2 successively, wherein a number of adding a number of unit patterns in vertical direction in each of the sub-stepped patterns more than 2 is substantially same with the first vertical unit pattern number, and a number of adding a number of unit patterns in horizontal direction in each of the sub-stepped patterns more than 2 is substantially same with the first horizontal unit pattern number.

14. The method of claim 12, wherein said approximating the repetitive pattern of said second optical plate comprises forming the second stepped pattern by connecting sub-stepped patterns more than 2 successively, wherein a number of adding a number of unit patterns in vertical direction in each of the sub stepped patterns more than 2 is substantially same with the second vertical unit pattern number, and a number of adding a number of unit patterns in horizontal direction in each of the sub-stepped patterns more than 2 is substantially same with said second horizontal unit pattern number.

15. The method of claim 11, wherein said first optical plate and said second optical plate is a lenticular plate or a parallax barrier on which a plurality of straight lines having substantially identical slant are arranged at a predetermined interval.

16. A computer readable medium for storing a method of forming pixel-cell for a three-dimensional image display, the method comprising:

regarding each side of rhombus pattern having an arbitrary vertex angle as a straight line having a predetermined slant;

calculating a number of unit pattern in vertical direction and a number of unit pattern in horizontal direction, corresponding to the predetermined slant;

approximating the predetermined slant to stepped patterns with the number of unit pattern in vertical direction and the number of unit pattern in horizontal direction; and forming a pixel cell using the stepped patterns;

wherein integer-numbered unit patterns are arranged in the pixel cell.

17. A computer readable medium for storing a three-dimensional image processing method for a three-dimensional image display, the method comprising:

obtaining a number of unit pattern in vertical direction (thereafter, a first vertical unit pattern number) and a number of unit pattern in horizontal direction (thereafter, a first horizontal unit pattern number), corresponding to a slant of repetitive pattern of a first optical plate (thereafter, a first slant);

obtaining a number of unit pattern in vertical direction (thereafter, a second vertical unit pattern number) and a number of unit pattern in horizontal direction (thereafter, a second horizontal unit pattern number), corresponding to a slant of repetitive pattern of a second optical plate (thereafter, a second slant);

approximating the repetitive pattern of the first optical plate using a first stepped pattern corresponding to the first vertical unit pattern number and the first horizontal unit pattern number; and approximating the repetitive pattern of the second optical plate using a second stepped pattern corresponding to the second vertical unit pattern number and second first horizontal unit pattern number, wherein cell pattern formed by the approximated repetitive pattern of the first optical plate and the approximated repetitive pattern of the second optical plate integer-numbered unit patterns is used as pixel cells for displaying three-dimensional image.

* * * * *

UNITED STATES PATENT AND TRADEMARK OFFICE
CERTIFICATE OF CORRECTION

| | |
|---|---|
| PATENT NO. | : 7,034,847 B2 |
| APPLICATION NO. | : 10/871140 |
| DATED | : April 25, 2006 |
| INVENTOR(S) | : Son et al. |

Page 1 of 1

It is certified that error appears in the above-identified patent and that said Letters Patent is hereby corrected as shown below:

In col. 1, line 59, delete "in" and insert -- In --, therefor.

In col. 5, line 39, delete "i/j" and insert --1/j--, therefor.

In col. 12, line 37, in Claim 17, before "is" delete "integer-numbered unit patterns".

In col. 12, line 38, in Claim 17, after "displaying" insert --a--.

Signed and Sealed this

Second Day of October, 2007

JON W. DUDAS
*Director of the United States Patent and Trademark Office*